United States Patent [19]

Duggal

[11] Patent Number: 5,102,176
[45] Date of Patent: Apr. 7, 1992

[54] RELEASABLE LOCK MECHANISM

[75] Inventor: Virinder Duggal, Bothell, Wash.

[73] Assignee: The Boeing Company, Seattle, Wash.

[21] Appl. No.: 470,941

[22] Filed: Jan. 26, 1990

[51] Int. Cl.$^5$ .................... B64D 25/14; A44B 11/25
[52] U.S. Cl. .................. 294/82.31; 294/82.24; 244/905; 24/602; 24/641
[58] Field of Search ........... 294/82.24, 82.25, 82.27, 294/82.31, 82.33, 82.34, 75; 244/137.2, 137.3, 905; 24/602, 629, 641, 642, 647; 403/321, 322

[56] References Cited

U.S. PATENT DOCUMENTS

| | | | |
|---|---|---|---|
| 844,710 | 2/1907 | Clough | 294/82.31 |
| 997,438 | 7/1911 | Clough | 294/82.33 |
| 1,101,113 | 6/1914 | Attfield | 294/82.34 |
| 1,383,252 | 6/1921 | Wearham | 294/82.33 |
| 2,603,524 | 7/1952 | Amelung | 294/82.35 |
| 2,903,292 | 9/1959 | Himel, Jr. | 294/75 |
| 3,259,418 | 7/1966 | Munday et al. | 294/82.33 |
| 3,633,960 | 1/1972 | Drayton | 294/75 |
| 3,852,854 | 12/1974 | Sigrud et al. | 244/137.2 |
| 3,973,744 | 8/1976 | Hintzman | 244/137.2 |
| 4,512,539 | 4/1985 | Ackermann et al. | 244/137.2 |
| 4,555,133 | 11/1985 | Danielsen et al. | 294/82.24 |
| 4,610,474 | 9/1986 | Jaatinen | 294/82.31 X |
| 4,720,065 | 1/1988 | Hamatani | 244/905 X |

Primary Examiner—Margaret A. Focarino
Assistant Examiner—Andrew C. Pike
Attorney, Agent, or Firm—Delbert J. Barnard

[57] ABSTRACT

The base (46) of a release hook (22) is located between two side members (30, 32) of a hook guide (20). A first end of the hook base (46) carries a first slide pin (50) having end portions projecting into a two-part slot (38, 40) of the guide (20). The second end of the hook base (46) carries a second slide pin (52) having opposite end portions which are movable between the slot (38, 40) and a two-part notch (42, 44). A link (24) is pivotally connected at its first end to an arm (64), which arm (64) is a part of a rotatable member (10) and pivotally moves about a second axis (88). The second end of the link (24) is pivotally attached to the hook base (46) for pivotal movement about a third axis (106). When the second slide pin (52) is within the notch (42, 44), the release hook (22) is held against movement, and the link (24) holds the arm (64) and rotatable member (10) against rotation about a first axis (62). A release pin (24) is positioned within the hook throat (54). A pull on the release pin (26) moves it against a hook tine (60), thus moving the second slide pin (52) from the notch (42, 44) and into the slot (38, 40), and thus freeing the release hook (22) and the link (24) to allow the arm (64) and the rotatable member (10) to rotate about the first axis (62).

10 Claims, 2 Drawing Sheets

RELEASABLE LOCK MECHANISM

DESCRIPTION

1. Technical Field

This invention relates to the provision of a releasable look mechanism for looking a rotatable member against rotation until released and which is easily released by a pull on a release pin.

2. Background Information

The releasable lock mechanism of the invention was developed for use with inflatable escape slide/raft structure which are provided on aircraft. These slide/raft structures are normally packaged in a deflated state in a container which may be a part of a door of the aircraft. In a known system, the deflated slide/raft is covered by a fabric wall which is in tension and which carries a plurality of rings along one edge. The rings engage a like number of pins which project radially outwardly from a rotatable member. This member is rotated in a direction moving the pins against the rings to in this manner tension the fabric wall. Then the member is locked in place by a releasable lock mechanism.

The releasable look mechanism of this invention is usable in such a system in place of the lock mechanisms which have been used for this purpose in the past. The known lock mechanisms are not at all similar to the lock mechanism of the present invention and for that reason they will not be described.

Although the releasable lock mechanism of the invention was developed for use with an emergency escape slide raft for an aircraft, such mechanism is not limited to this use but rather has other utility.

SUMMARY OF THE INVENTION

A releasable lock mechanism of the present invention is basically characterized by a hook guide, a release hook, a link and a release pin. The hook guide has a release pin supporting surface, a slide pin slot offset from said surface, and a slide pin notch in a side portion of the slot. The release hook has a base, first and second spaced apart slide pins carried by said base, and a hook tine extending from the base and defining a hook throat confronting said supporting surface. The first slide pin is located within said slot and the second slide pin is movable between the slot and the notch. The link has a first end which is pivotally attached to a rotatable member which is rotatable about a first axis. The first end of the link is pivotally attached to the rotatable member for pivotal movement about a second axis which is spaced from the first axis. The link includes a second end which is pivotally attached to the hook base for pivotal movement about a third axis. The first, second and third axes are parallel to each other. The release pin has a base, a first end, and a second end including a central portion sized to be received within the hook throat. In preparation for use the base of the release pin is placed on the supporting surface of the hook guide and the central portion of the release pin is positioned within the hook throat. The release hook is moved to place the second slide pin within the notch. This placement of the second slide pin within the notch, while the first slide pin is within the slot, positions the hook tine contiguous the central portion of the release end and locks the release hook in position relative to the hook guide. When the release hook is locked in position relative to the hook guide the link is locked against movement and the release hook and the link together lock the rotatable member against rotation about the first axis. The release pin is configured such that a pull on the first end of the release pin will cause the central portion of the release pin to move against and raise the hook tine away from the supporting surface and at the same time move the second slide pin out of the notch into the slot. When both the first and second slide pins are within the slot the release hook is free to slide relative to the hook guide. Such sliding of the release hook allows the link to move and this in turn allows the rotatable member to rotate in position about the first axis.

In preferred form, the hook guide comprises a pair of laterally spaced apart side members. The releasable hook is positioned between the side members. The supporting surface is in two parts, one part on each of the side members. The support surface parts laterally bound the release hook, on opposite sides of the release hook. Also in preferred form, the slide pin slot is in two parts, one part in each side member, and the side pin notch is in two parts, one part in each slide member. Also, the first and second side pins each includes two portions, said portions projecting laterally outwardly from opposite sides of the hook base. The hook base has an end portion opposite the tine which is defined by two side parts separated by a slot. The second end of the link is located within said slot and includes a transverse opening. The first slide pin includes a central portion disposed within said opening. The opening and the central portion of the first slide pin pivotally attach the second end of the link to the hook base. In preferred form, the base of the release pin is wider than the hook tine and has side portions which rest on the two parts of the supporting surface. The release pin has opposite side walls outwardly flanking the central portion. The side walls and the central portion define a channel for receiving the hook tine. The central portion of the release pin is longitudinally convex. In preferred form the hook guide comprises a mounting base to which the side members are attached.

The engagement of the second slide pin within the notch firmly and securely looks the release hook in position relative to the hook guide. The locked release hook prevents movement of the second end of the link and the link holds the rotatable member in position, preventing it from rotating about the first axis. The various parts remain fixed as long as the second slide pin is within the notch. A simple pull on the release pin causes the central portion of the release pin to move against the tine of the release hook. The moving release pin exerts a force on the hook tine which pulls the second slide pin out of the notch and positions it within the slot. Once the second slide pin is within the slot the release hook is free to slide relative to the hook guide. The first and second slide pins guide the release hook as it slides and as it slides the second end of the link is moved in a direction permitting pivotally movement of the link at both of its ends. This movement of the link allows the rotatable member to rotate in position about the first axis.

Other objects, features and advantages of the invention are hereinafter set forth in the description of the Best Mode of the Invention.

BRIEF DESCRIPTION OF THE DRAWINGS

In the drawings, like element reference numerals refer to like parts throughout the several views, and.

BEST MODE FOR CARRYING OUT THE INVENTION

Figure 1:
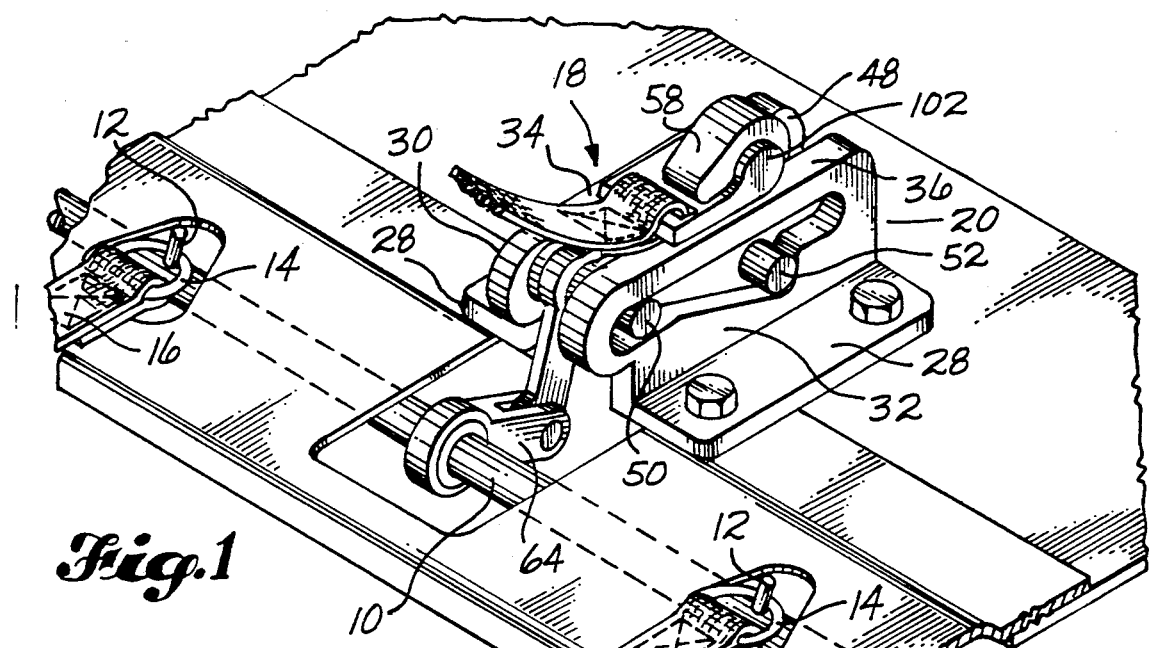
FIG. 1 is a fragmentary pictorial view of a releasable lock mechanism constructed according to the present invention, such view showing the look mechanism in a locked position as a part of a storage system for an inflatable slide raft.

FIG. 1 shows a rotatable member 10 in the form of an elongated rod which carries a plurality of spaced apart pins 12. The pins 12 engage rings 14 which are carried by straps 16 connected to a fabric wall (not shown). The fabric wall extends over a stowed escape slide (not shown). The opposite end of the fabric wall is fixed in position. The rod 10 is rotated to in turn move the pins 12 against the rings 14 in a direction stretching the fabric wall and the straps 16. A releasable lock mechanism 18, constructed in accordance with the present invention, serves to hold the rotatable rod 10 in position to maintain tension within the fabric wall and straps 16 until the mechanism 18 is operated to release or unlock the member 10. Upon such a release, the rod 10 is free to rotate and the tension within the fabric wall and straps 16 imposes a rotational force on the pins 12. This causes rod 10 to rotate until the pins 12 no longer engage the rings 14. At this time the escape slide begins to inflate and as it inflate it pushes on the fabric wall, moving the fabric wall out of its way. As it inflates, the escape slide pushes on the fabric wall and this moves the rings 14 away from the pins 12 and also moves the fabric wall out of the path of movement of the escape slide.

The releasable lock mechanism 18 comprises a hook guide 20, a release hook 22, a link 24 and a release pin 26.

Hook guide 20 comprises a base 28 and a pair of side members 30, 32. The side members 30, 32 are connected to the base 28 and they extend generally perpendicular from the base 28. The side members 30, 32 are laterally spaced apart and each is substantially identical to the other. The hook guide 20 has a release pin supporting surface which is in two parts. A first part 34 is on the top of side member 30 and the second part 36 is on the top of side part 32. The hook guide also includes a two part slide pin slot which is offset from the supporting surface 34, 36. A first part of the slot is designated 38 and it is formed in side member 30. The second side part of the slot is designated 40 and it is formed in the side member 32. Hook guide 20 also includes a two part slide pin notch. The first part of this notch is designated 42. It is formed in side member 30. The second part of the notch is designated 44. It is formed in the side part 32. The notch 42, 44 is formed in a side portion of the slot 38, 40.

The release hook 22 includes an elongated base 46 and a hook tine 48. Base 46 provides a support for a pair of spaced apart slide pins 50, 52. Slide pins 50, 52 each extend laterally through the hook base 46 and have opposite end portions which project laterally outwardly from opposite sides of the hook base 46, much like trunions. Slide pin 50 is always located within the slot 38, 40. Slide pin 52 is movable between a position within the notch 42, 44 and a position within the slot 38, 40. Slot 38, 40 is longer than the spacing between the slide pins 50, 52. As a result, when the slide pins 50, 52 are both within the slot 38, 40, the release hook 22 is free to slide lengthwise of the slot 38, 40, relative to the hook guide 20. The hook base 46 is positioned between the side members 34, 36 when the slide pins 50, 52 are within the slide pin slot 38, 40. The hook tine 48 extends upwardly from the base 46 and then angles downwardly towards the base 46 so as to define a hook throat 54 which confronts the release pin supporting surface 34, 36. Hook tine 48 comprises a stem portion 56 which may extend substantially perpendicular to base 46 and an end portion 58 having a sloping throat surface 60.

Figure 2:
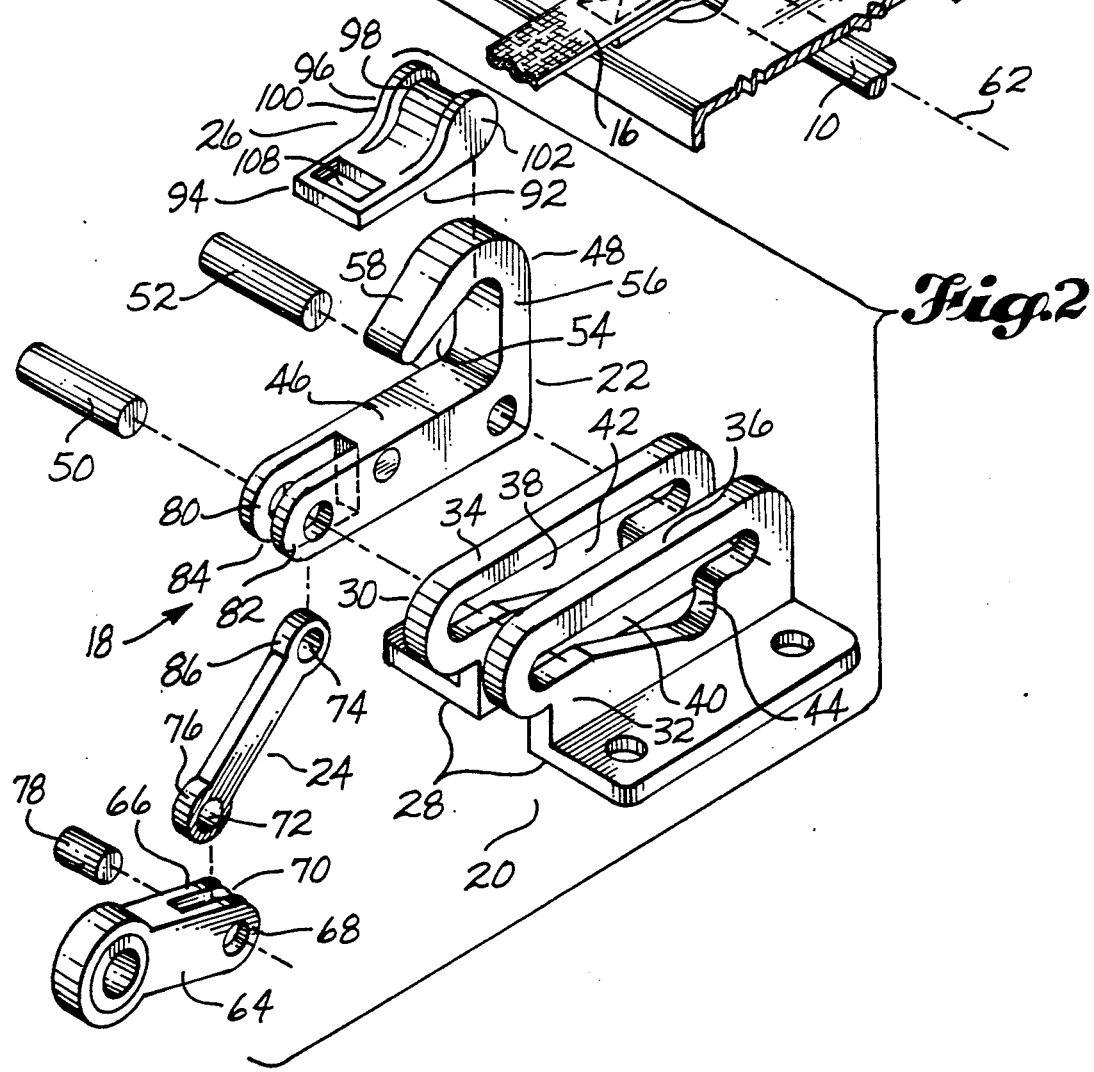
FIG. 2 is an exploded pictorial view of the lock mechanism shown by FIG. 1.

The rotatable member 10 may be mounted for rotation about a first axis 62. In preferred form, rotatable member 10 includes an arm 64 which extends radially outwardly from the axis 62. Arm 64 may have a free end portion comprising spaced apart side parts 66, 68 (FIG. 2) separated by a slot 70. Link 24 may be constructed from bar stock of uniform thickness, with rounded end portions including openings 72, 74 (FIG. 2). The first end portion 76 may be positioned within the slot and may be connected to the side parts 66, 68 of arm 64 by a pivot pin 78 which extends through aligned openings in the side parts 66, 68 and through the opening 72 in link 24.

Figure 3:
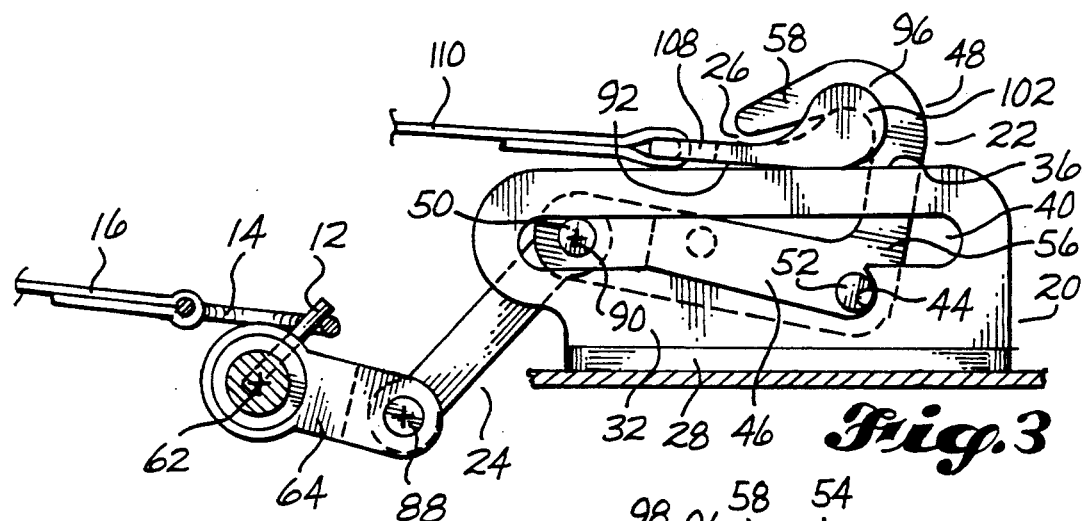
FIG. 3 is a side elevational view of the lock mechanism shown by FIG. 1 and 2, in a "lock" position.
Figure 4:
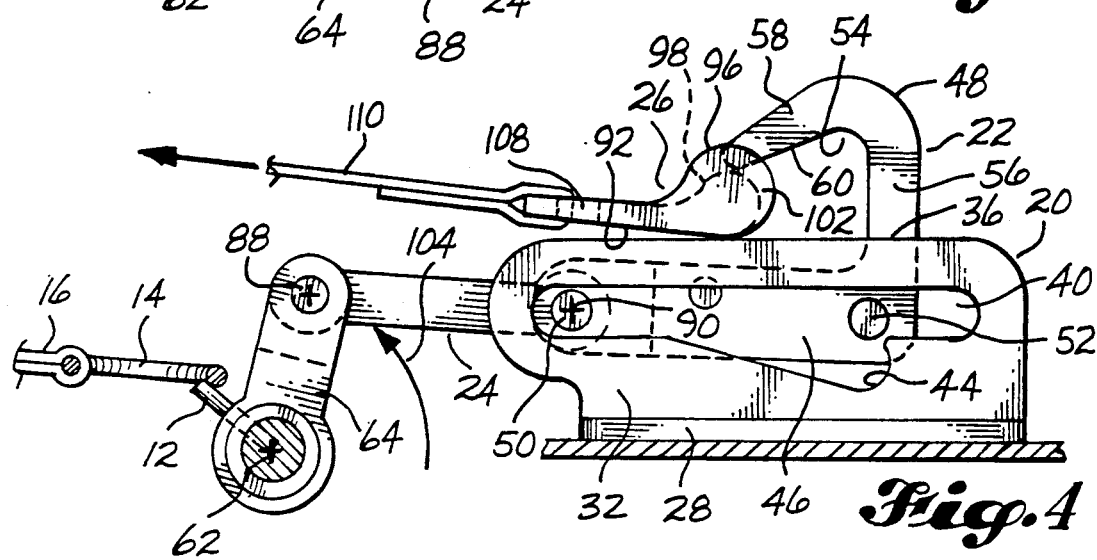
FIG. 4 is a view like FIG. 3, showing a release pin being pulled and in the final stages of release.
Figure 5:
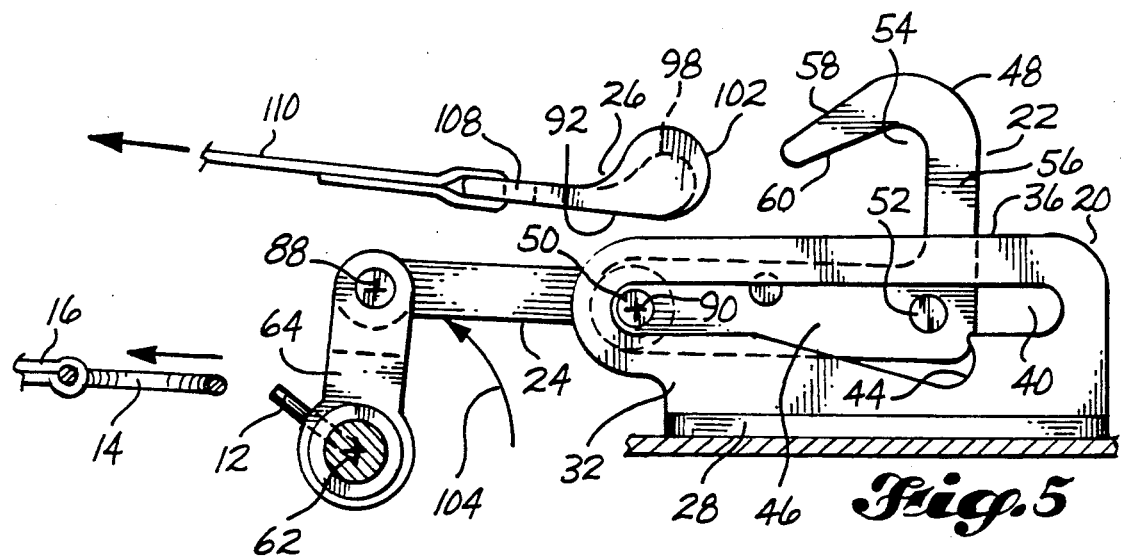
FIG. 5 is a view like FIG. 3 and 4, showing the released rotatable member moving to a position in which it is disconnected from the escape slide/life raft cover.

The end of hook base 46 opposite the tine 48 may also be constructed to include a pair of side parts 80, 82 separated by a slot 84 (FIG. 2). The second end portion 86 of link 24 is positioned within slot 84. The first slide pin 50 extends through aligned openings in the parts 80, 82 and through the opening 74 in link 24. A central portion of slide pin 50 is positioned within opening 74 and with opening 74 forms a pivotal connection between the second end of link 24 and the hook base 46. In the manner described, the first end of link 24 is pivotally attached to the arm 64 for pivotal about a second axis 88 (FIGS. 3-5). The second end of link 24 is pivotally connected to the hook base 46 for pivotal movement about a third axis 90. Axes 62, 88, 90 are each parallel to each other.

In preferred form, the release pin 26 includes a flat base 92. Release pin 26 has opposite side portions which rest on the two parts 34, 36 of the release pin supporting surface. Release pin 26 includes a first end 94 and a second end 96 which includes a central portion 98 (FIG. 2). Central portion 98 extends upwardly from the base 92 and is of convex curviture lengthwise of the release pin 26. Release pin 26 includes opposite side walls 100, 102 outwardly flanking the central portion 98. Side walls 100, 102 and central portion 98 together define a channel for receiving the hook tine 48.

The releasable look mechanism is put into a locking position in the following manner. The base 92 of the release pin 26 is placed on the supporting surface 30, 32. The central portion 98 of the release pin 26 is positioned within the hook throat 54. The release hook 22 is moved to place the second slide pin 52 into the notch 42, 44. This placement of the second slide pin 52 within the notch 42, 44 also positions the hook tine contiguous the central portion 98 of the release pin 26. When the release hook 22 is looked in position relative to the hook guide 20 the link 24 is looked against movement in response to the rotatable member 10 wanting to rotate in the direction indicated by arrow 104 in FIG. 4. In the installation shown by FIG. 1, the tension in the fabric wall and the straps 16 applies a force on rotatable member 10 wanting to make it rotate in the direction indicated by arrow 104. In some other installation, the force wanting to cause rotation may be applied to the rotatable member in some other manner.

As shown by FIG. 2, the force or load applied by arm 64 on the link 24 imposes an end wise force on link 24 which is in turn imposed by the link 24 by the hook base 46, in a direction forcing the second slide pin 52 into tight engagement with the notch 42, 44. Thus, the force or load applied to rotatable member 10 inturn implies a force on the release hook 22 in a direction holding the release hook 22 in a locked position, with the second slide pin 52 within the notch 42, 44. As shown by FIG. 3, when release hook 22 is in this locked position, the second end of the link 22 is held against movement in the direction that it wants to move, viz. lengthwise of the slot 38, 40 away from the rotatable member 10. This holding of the second end of link 24 against movement also prevents movement of the first end of the link 24. Thus, the link 24 holds arms 64 against movement and as a result the rotatable member 10 is prevented from rotating about the first axis 62.

As clearly shown by FIGS. 4 and 5, the releasable lock mechanism can be easily released by a simple pull on the first end of release pin 26. In the illustrated embodiment the first end 94 the release pin 26 includes a slot 108 (FIG. 2) and a strap or other tension member 110 extends through the slot 108 and is secured on its self, to form a bight, serving to connect the member 110 to the release pin 26.

As shown by FIG. 4, a pull on the first end of release pin 26, such as by pulling on a tension member 110 that is connected to release 26 in the manner described, causes the central portion 98 of the release pin to move against the throat surface 60 of hook tine part 58. This imposes a first force on the release hook 22 in a direction generally lengthwise of the slot 38, 40. The release hook 22 is free to move in this direction until the first slide pin 50 contacts the end of the slot 38, 40. However, before this happens, the release hook 22 moves endwise a sufficient amount to move the second slide pin 52 out of the notch 42, 44. Central portion 98 of release pin 26 also exerts a force on hook tine part 58 tending to move it upwardly away from the supporting surface 34, 36. Thus, after the second slide pin 52 is moved out of the notch 42, 44, the central portion 98 of release pin 26 lifts the hook and moves the second slide pin 52 into the slot 38, 40. When this happens the second end of the link 24 is no longer held against movement. The load acting on arm 64, tending to rotate it in the direction indicated by arrow 104, now acts through the link 24 against the hook base 46 and pushes the hook base endwise away from rotatable member 10. The two slide pins 50, 52 guide the release hook 22 and release hook 22 slides lengthwise of the slot 38, 40, away from the rotatable load 10. At the same time, the load acting on arm 64 causes arm 64 to rotate in the direction of arrow 104. Rotatable member 10, of which arm 64 is apart, rotates about the first axis 62. In the installation shown by FIG. 1, this rotation of member 10 allows the pins 12 to move into a position allowing the release of rings 4. In some other installation, a different function may occur in response to rotation of the rotatable member.

As will be evident to a person of ordinary skill in the art, the details of construction can be varied without departing from the basic concept of the invention. The illustrated embodiment constitutes the preferred embodiment, or best mode, but is primarily presented to provide an example form of the invention. The scope of protection is not to be limited by the details of the preferred embodiment. Rather, the scope of protection is to be determined by the appended claims, interpreted in accordance with established rules of patent claim interpretation, including use of the Doctrine of Equivelents.

What is claimed is:

1. For use with a rotatable member that is rotatable about a first axis, a releasable look mechanism for locking the rotatable member against rotation comprising:

a hook guide having a release pin supporting surface, a slide pin slot offset from said surface, and a slide pin notch in a side portion of the slot;

a release hook having a base, first and second spaced apart slide pins carried by said base, said first slide pin being located within said slot and said second slide pin being movable between said slot and said notch, and a hook tine extending from the base and defining a hook throat confronting said supporting surface;

a link having a first end pivotally attached to said rotatable member, for pivotal movement about a second axis spaced from said first axis, and a second end pivotally attached to the hook base for pivotal movement about a third axis, said first, second, and third axes being parallel to each other; and a release pin having a base, a first end, and a second end including a central portion sized to be received within said hook throat;

wherein in use the base of the release pin is placed on the supporting surface of the hook guide, and the central portion of the release pin is positioned within said hook throat, and the release hook is moved to place the second slide pin within said notch;

wherein said placement of the second slide pin within said notch, while the first slide pin is within said slot, positions the hook tine contiguous the central portion of the release pin and looks the release hook in position relative to the hook guide;

wherein when the release hook is locked in position relative to the hook guide the link is locked against movement and the release hook and the link together lock the rotatable member against rotation about the first axis;

wherein the release pin is configured such that a pull on the first end of the release pin will cause the central portion of the release pin to move against and raise the hook tine away from the supporting surface and at the same time move the second slide pin out of said notch into said slot; and wherein when both the first and second slide pins are within said slot, said release hook is free to slide relative to the hook guide, and such sliding of the release hook allows the link to move and this in turn allows the rotatable member to rotate in position about the first axis.

2. A releasable lock mechanism according to claim 1, wherein said hook guide comprises a pair of laterally spaced apart side members, said releasable hook is positioned between said side members and said supporting surface is in two parts, one part on each of said side members, said support surface parts laterally bounding the release hook on opposite sides of the release hook.

3. A releasable look mechanism according to claim 2, wherein said slide pin slot is in two parts, one part in each side member, and the slide pin notch is in two parts, one part in each said side member, and wherein said first and second slide pins each includes two portions, said portions projecting laterally outwardly from opposite sides of the release hook.

4. A releasable lock mechanism according to claim 3, wherein the base of said release hook has an end portion opposite the tine defined by two side parts separated by a slot, wherein said second end of the link is located within said end slot and said second end includes a transverse opening, and wherein the first slide pin includes a central portion disposed within said opening, and said opening and the central portion of the first slide pin pivotally attach the second end of the link to the hook base.

5. A releasable lock mechanism according to claim 2, wherein the base of the release pin is wider then the hook tine and has side portions which rest on the two parts of the supporting surface, and wherein the release pin has opposite side walls outwardly flanking the central portion and with said central portion defining a channel for receiving the hook tine, and wherein the central portion of the release pin is longitudinally convex.

6. A releasable lock mechanism according to claim 5, wherein said hook guide comprises a mounting base to which said side members are attached.

7. In combination, a rotatable member that is rotatable about a first axis; and
- a releasable lock mechanism for locking the rotatable member against rotation, comprising:
- a hook guide having a release pin supporting surface, a slide pin slot offset from said surface, and a slide pin notch in a side portion of the slot;
- a release hook having a base, first and second spaced apart slide, pins carried by said base, said first slide pin being located within said slot and said second slide pin being movable between said slot and said notch, and a hook tine extending from the base and defining a hook throat confronting said supporting surface;
- a link having a first end pivotally attached to said rotatable member, for pivotal movement about a second axis spaced from said first axis, and a second end pivotally attached to the hook base for pivotal movement about a third axis;
- said first, second, and third axes being parallel to each other; and
- a release pin having a base, a first end, and a second end including a central portion sized to be received within said hook throat;
- wherein in use the base of the release pin is placed on the supporting surface of the hook guide, and the central portion of the release pin is positioned within said hook throat, and the release hook is moved to place the second slide pin within said notch;
- wherein said placement of the second slide pin within said notch, while the first slide pin is within said slot, positions the hook tine contiguous the central portion of the release pin and locks the release hook in position relative to the hook guide;
- wherein when the release hook is locked in position relative to the hook guide the link is locked against movement and the release hook and the link together lock the rotatable member against rotation about the first axis;
- wherein the release pin is configured such that a pull on the first end of the release pin will cause the central portion of the release pin to move against and raise the hook tine away from the supporting surface and at the same time move the second slide pin out of said notch into said slot; and
- wherein when both the first and second slide pins are within said slot, said release hook is free to slide relative to the hook guide, and such sliding of the release hook allows the link to move and this in turn allows the rotatable member to rotate in position about the first axis.

8. The combination of claim 7, wherein said hook guide comprises a pair of laterally spaced apart side members, said releasable hook is positioned between said side members and said supporting surface is in two parts, one part on ea oh of said side members, said support surfaces laterally bounding the release hook on opposite sides of the release hook.

9. The combination of claim 8, wherein said slide pin slot is in two parts, one part in each side member, and the slide pin notch is in two parts, one part in each said side member, and wherein said first and second slide pins ea oh includes two portions, said portions projecting laterally outwardly from opposite sides of the release hook.

10. The combination of claim 8, wherein the base of the release pin is wider then the hook and tine has side portions which rests on the two parts of the supporting surface, and wherein the release pin has opposite side walls outwardly flanking the central portion and with said central portion defining a channel for receiving the hook tine and wherein the central portion of the release pin is longitudinally convex.

* * * * *

UNITED STATES PATENT AND TRADEMARK OFFICE
CERTIFICATE OF CORRECTION

PATENT NO. : 5,102,176
DATED : April 7, 1992
INVENTOR(S) : Virinder Duggal

It is certified that error appears in the above-identified patent and that said Letters Patent is hereby corrected as shown below:

Col. 1, line 7, "look mechanism for looking" should be -- lock mechanism for locking --.
Col. 1, line 24, "look" should be -- lock --.
Col. 2, line 19, "side pin notch" should be -- slide pin notch --.
Col. 2, line 20, "slide member" should be -- side member --.
Col. 2, line 21, "side pins" should be -- slide pins --.
Col. 2, line 42, "looks" should be -- locks --.
Col. 2, line 58, "pivotally" should be -- pivotal --.
Col. 3, line 3, "look" should be -- lock --.
Col. 3, line 9, "Fig." should be -- Figs. --.
Col. 3, line 12, "Fig.", second occurrence, should be -- Figs. --.
Col. 3, line 36, "inflate" should be -- inflates --.
Col. 4, line 25, after "slot", insert -- 70 --.
Col. 4, line 40, after "pivotal", insert -- movement --.
Col. 4, line 51, "curviture" should be -- curvature --.
Col. 4, line 56, "look" should be -- lock --.
Col. 4, lines 65 and 66, "looked" should be -- locked --.
Col. 5, line 4, "installation," should be -- installations, --.
Col. 5, line 8, "end wise" should be -- endwise --.
Col. 5, line 12, "inturn" should be --in turn--.
Col. 5, line 28, after "end 94", insert -- of --.

UNITED STATES PATENT AND TRADEMARK OFFICE
CERTIFICATE OF CORRECTION

PATENT NO. : 5,102,176
DATED : April 7, 1992
INVENTOR(S) : Virinder Duggal

It is certified that error appears in the above-identified patent and that said Letters Patent is hereby corrected as shown below:

```
Col. 5, line 35, after "release", insert -- pin --.
Col. 5, line 60, "apart," should be -- a part, --.
Col. 5, line 63, "rings 4" should be -- rings 14 --.
Claim 1, col. 6, line 11, "look" should be -- lock --.
Claim 1, col. 6, line 43, "looks" should be -- locks --.
Claim 3, col. 7, line 1, "look" should be -- lock --.
Claim 4, col. 7, line 12, "a slot," should be -- an end slot, --.
Claim 5, col. 7, line 20, "then" should be -- than --.
Claim 7, col. 7, line 36, delete the comma after "rotation".
Claim 7, col. 7, line 41, delete the comma after "slide".
Claim 7, col. 7, line 52, "axis;" should be -- axis, --.
Claim 8, col. 8, line 36, "ea oh" should be -- each --.
Claim 9, col. 8, line 43, "ea oh" should be -- each --.
Claim 10, col. 8, line 47, insert -- and -- after "tine"; and in line
```

UNITED STATES PATENT AND TRADEMARK OFFICE
CERTIFICATE OF CORRECTION

PATENT NO. : 5,102,176

DATED : April 7, 1992

INVENTOR(S) : Virinder Duggal

It is certified that error appears in the above-identified patent and that said Letters Patent is hereby corrected as shown below:

Claim 10, col. 8, line 47, insert --and-- after "tine", and in line 48, "rests" should be --rest--.

Signed and Sealed this

Seventeenth Day of August, 1993

*Attest:*

BRUCE LEHMAN

*Attesting Officer*  Commissioner of Patents and Trademarks